A. JOHNSTON.
LAWN MOWER.
APPLICATION FILED MAY 16, 1914.
1,255,885.
Patented Feb. 12, 1918.
2 SHEETS—SHEET 1.
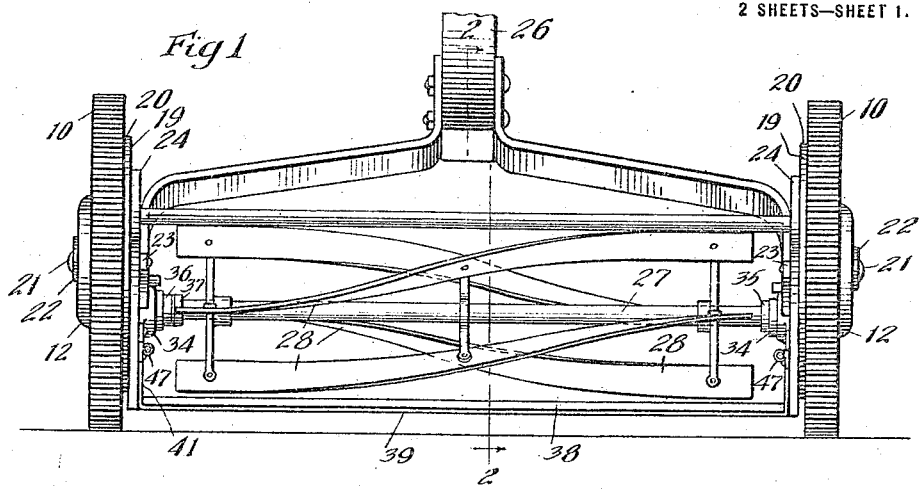
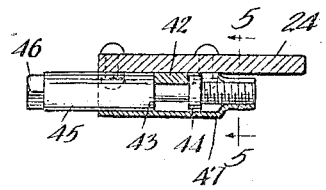
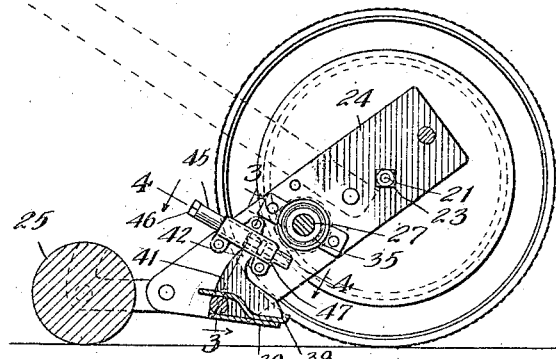
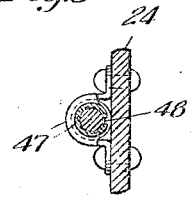
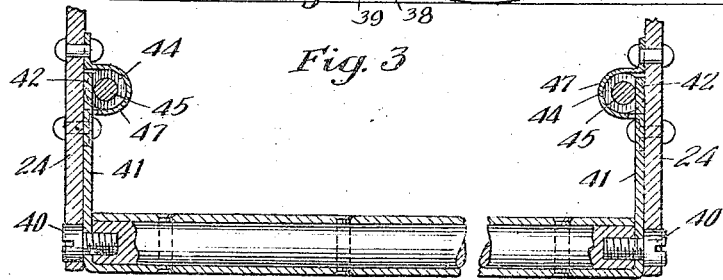
Witnesses:
Wm. Geiger
Esther Abrams.
Inventor:
Allen Johnston
By Munday, Evarts, Adcock & Clarke
Attys.

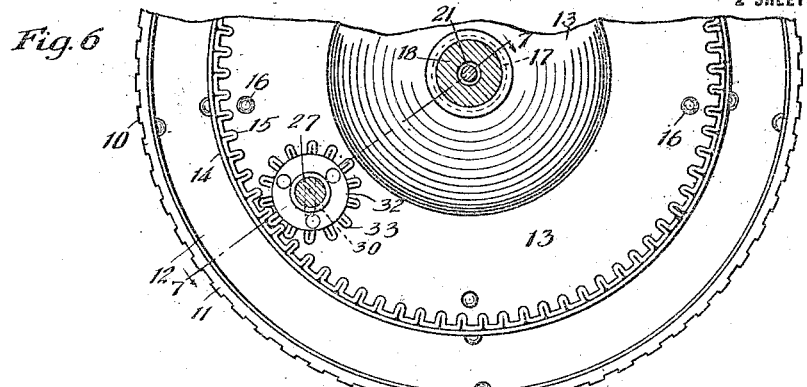
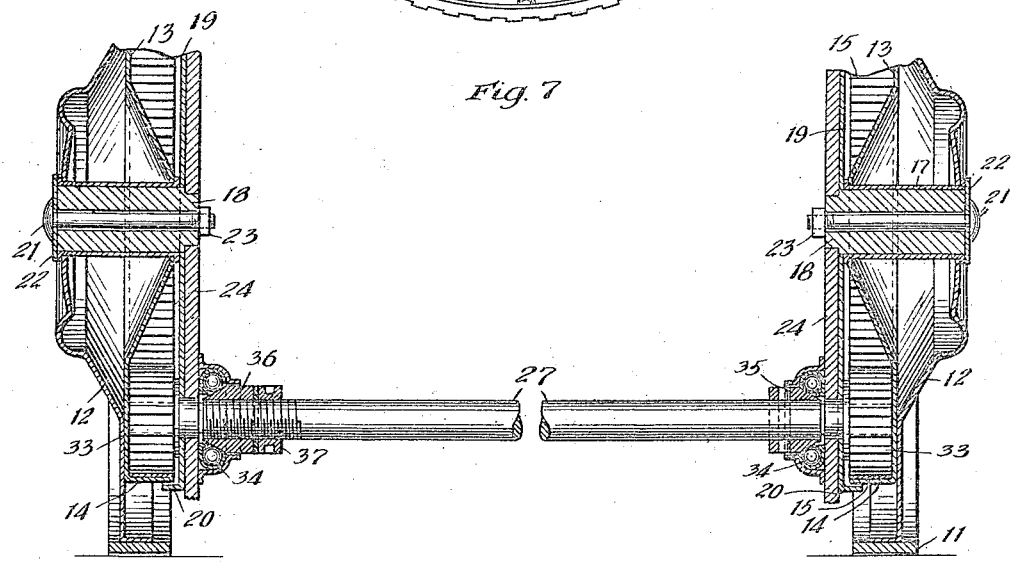
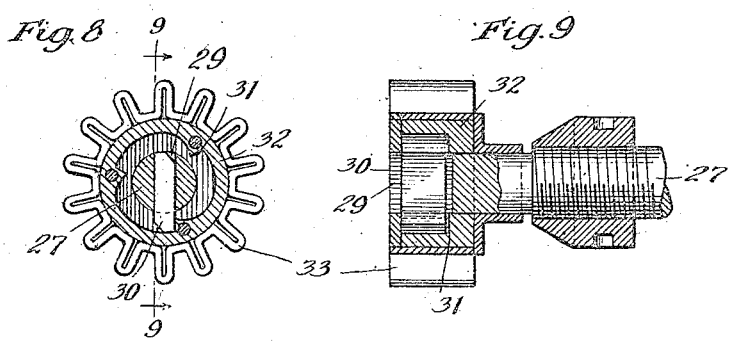

UNITED STATES PATENT OFFICE.

ALLEN JOHNSTON, OF OTTUMWA, IOWA, ASSIGNOR TO JOHNSTON PRESSED GEAR COMPANY, OF OTTUMWA, IOWA.

LAWN-MOWER.

1,255,885. Specification of Letters Patent. Patented Feb. 12, 1918.

Application filed May 16, 1914. Serial No. 838,934.

*To all whom it may concern:*

Be it known that I, ALLEN JOHNSTON, a citizen of the United States, residing in Ottumwa, in the county of Wapello and State of Iowa, have invented a new and useful Improvement in Lawn-Mowers, of which the following is a specification.

This invention relates to improvements in lawn mowers.

Objects of the invention are to provide a lawn mower which is of steel construction throughout whereby danger of breakage is minimized, the life prolonged and ease of operation increased; to provide a lawn mower in which the bed knife is adjusted by single screws operating in sheet metal threaded spring sockets which automatically hold the screws in adjusted position; to provide a lawn mower in which the driving gears and pinions are made of sheet steel; and to provide a lawn mower in which the reel is rotated through a compulsory operating ratchet.

The invention furthermore consists in the improvements in the parts and devices and in the novel combinations of the parts and devices herein shown, described or claimed.

In the drawing forming a part of this specification, Figure 1 is a front elevation of a lawn mower embodying my improvements. Fig. 2 is a vertical section taken substantially on the line 2—2 of Fig. 1. Fig. 3 is an enlarged detail sectional view taken substantially on the line 3—3 of Fig. 2. Fig. 4 is an enlarged detail sectional view taken substantially on the line 4—4 of Fig. 2. Fig. 5 is a detail sectional view taken substantially on the line 5—5 of Fig. 4. Fig. 6 is an elevation of a portion of one of the driving wheels showing the inner side thereof and the pinion associated therewith. Fig. 7 is a broken longitudinal sectional view of the mower taken substantially on the line 7—7 of Fig. 6. Fig. 8 is a detail view showing one of the pinions and the ratchet mechanism between it and the reel shaft, and Fig. 9 is a detail view taken substantially on the line 9—9 of Fig. 8 and showing a portion of the reel shaft and the cone of the ball-bearing.

In said drawing, the lawn mower is shown as having end driving wheels 10, 10, each of which consists of a peripheral corrugated band 11, stamped sheet steel outer plate 12 and inner stamped sheet steel plate 13, the latter being flanged as shown at 14 and having secured to the inner side thereof an internal driving gear 15 which is also preferably formed of sheet steel. The plates 12 and 13 besides being connected by the rivets 16, as shown in Fig. 6, are also connected by a hub 17 so that the wheel is adapted to rotate about a stub shaft 18. At the inner end of each shaft 18 there is secured a stamped sheet metal plate 19 which is flanged around its periphery, as indicated at 20, and which fits over the flange 14, the fit between these parts being such as to form a practically dust-proof casing for the gearing within the wheel. Each driving wheel is held in place on its corresponding shaft by a bolt 21, washer 22 and nut 23. Rigidly secured to each plate 19 and extending rearwardly and downwardly therefrom is a plate 24, which plates 24 have secured thereto in any well-known manner, the rear roller 25. The operating handle 26 is pivotally connected to the plates 24 in any well-known manner.

The plates 19 and 24 are provided with alined holes through which extend the opposite ends of the reel shaft 27, the latter having a plurality of blades 28 arranged in the usual manner. Each end of the reel shaft 27 is slotted, as indicated at 29 in Figs. 8 and 9, in which is slidably mounted a pawl in the form of a steel plate 30 beveled at each end. Each pawl 30 coöperates with a ratchet 31 formed on the inner side of a shell 32 to the periphery of which is secured a sheet steel pinion 33 adapted to mesh with one of the driving gears 15 (see Fig. 6). From an inspection of Fig. 8, it will be seen that the ratchet connection between the reel and pinion 33 is such that the plate pawls are always positively operated to engage with the ratchets. The steel plate pawls 30 are also axially movable relatively to the reel shaft 27 to accommodate longitudinal adjustment of the latter which is effected by means hereinafter described. At one side of the mower, the reel shaft 27 is mounted in a ball-bearing 34 and has a cone 35 fixed thereto. At the opposite end of the reel shaft a similar ball-bearing is provided but the cone 36 is adjustably threaded on the shaft and is held in position by means of a lock-nut 37.

Referring now to Figs. 2, 3, 4 and 5, it will be seen that a bed knife 38 is provided which is mounted on a frame 39 pivotally connected to the plates 24 by screw bolts 40. At each end of the frame 39, there is an upwardly projecting arm 41 which narrows down to a point 42. Each of the points 42 engages in a recess formed between a shoulder 43 and collar 44 on an adjusting screw 45, which adjusting screw has a nut end 46, see Fig. 4. The screw 45 is mounted within a sheet steel spring socket member 47 secured to the plate 24. The screws 45 and socket members 47 are provided with co-operating threads at their inner ends, as shown in Fig. 4 and, as shown most clearly in Fig. 5, each sheet steel socket member is broken away or interrupted as indicated at 48. With this arrangement, the socket member or nut acts automatically, on account of its inherent springiness or resilience, to clamp or hold the adjusting screw in whatever position it may be turned to thus do away with the necessity of set screws or other equivalent devices which have been hitherto commonly used. With my arrangement, to adjust the bed knife either toward or from the reel blades, it is only necessary to turn the single screws 45, 45.

From the preceding description, it will be seen that the steel construction provided permits of the parts being made lighter than has hitherto been customary with the cast iron constructions and furthermore there is less danger from breakage. By providing sheet steel driving gears and pinions, the same are not only thus made light, but they can be made narrower than the cast gears and still maintain the necessary strength and wearing qualities with the result that the friction between the driving gears and pinions is materially reduced, thus contributing to the ease of operation of the mower.

Although I have herein shown and described what I now consider the preferred embodiment of my improvements, yet it will be understood that various changes and modifications may be made without departing from the spirit of the invention, and all such changes and modifications are contemplated as come within the scope of the claims appended hereto.

I claim:

1. A lawn mower having, in combination: a drive wheel; a reel; a bed knife; and means for adjusting the bed knife, said means including a sheet metal threaded spring socket, a screw adjustably mounted therein and connections between the screw and the bed knife, the spring socket automatically serving to hold the screw in adjusted position, substantially as specified.

2. In a lawn mower, a bed knife and means for adjusting the same, said means including a sheet metal threaded spring socket, a screw adjustably threaded therein and held in adjusted positions by spring pressure of the socket upon it, connections between the screw and the bed plate to move the latter in accordance with the adjustments of the screw, and means for rotating the screw, substantially as specified.

3. A lawn mower having a bed knife, a pivotally mounted frame by which said knife is carried, and means for adjusting said frame with the knife angularly about its pivotal supports, said means including a threaded sheet steel spring socket, a screw adjustably threaded therein and held in adjusted positions by spring pressure of the socket upon it, said screw having a reduced portion and a projection from the frame working in said reduced portion, substantially as specified.

4. A lawn mower having in combination side plates, a reel, a bed knife comprised of a plurality of sheet metal plates superimposed one above the other, the lower plate being flat and provided with means for fastening it to said side bars or plates and the upper plate being rigidly secured to said lower plate and offset longitudinally to stiffen said bed knife, substantially as specified.

5. A lawn mower having in combination side plates, a reel, a bed knife comprised of a plurality of plates superimposed one above the other, the lower plate being flat and provided with means for fastening it to said side plates and the upper plate being rigidly secured to said lower plate and offset longitudinally to stiffen said bed knife, and a rod disposed in the offset in said upper plate, substantially as specified.

6. A lawn mower having in combination side bars, a reel, a bed knife adjustably secured to said side bars and comprising a plurality of superimposed plates rigidly secured together, one of which is flat and the other offset longitudinally, a rod disposed through the bed in said offset plate to stiffen the bed knife and to form a pivoted member for adjusting said bed knife to desired position, substantially as specified.

7. A lawn mower having in combination side bars, a reel, a bed knife and means for adjusting said bed knife, said means including a threaded socket secured to said side bars and provided with a slot, a member extending from said bed knife through said slot, and a screw member in threaded engagement with said socket and having a reduced portion in which is engaged said member whereby to permit adjustment of the bed knife through rotation of said screw, substantially as specified.

8. In a lawn mower having in combination: a drive wheel, a reel, a bed knife, and means for adjusting the bed knife, said means including an elastic and rigid member, one member connected to the bed knife and another member to a part of the machine with respect to which it is desired to effect the adjustment.

9. In a lawn mower having in combination: a drive wheel, a reel, a bed knife, and means for adjusting the bed knife, said means including an elastic and rigid member, one member connected to the bed knife and another member to a part of the machine with respect to which it is desired to effect the adjustment, said elastic means embracing the rigid means and holding the parts in adjusted positions.

Signed this 8th day of May, 1914, in the presence of two witnesses.

ALLEN JOHNSTON.

Witnesses:
R. W. FUNK,
A. G. HARROW.

Copies of this patent may be obtained for five cents each, by addressing the "Commissioner of Patents, Washington, D. C."